(12) United States Patent
Hamilton, II et al.

(10) Patent No.: US 11,496,598 B2
(45) Date of Patent: Nov. 8, 2022

(54) CACHING DATA AT NETWORK PROCESSING NODES BASED ON DEVICE LOCATION

(75) Inventors: Rick A. Hamilton, II, Charlottesville, VA (US); Neil A. Katz, Parkland, FL (US); Brian M. O'Connell, Cary, NC (US); Keith R. Walker, Austin, TX (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 2762 days.

(21) Appl. No.: 11/608,859

(22) Filed: Dec. 11, 2006

(65) Prior Publication Data

US 2008/0140840 A1   Jun. 12, 2008

(51) Int. Cl.
| | |
|---|---|
| H04L 29/08 | (2006.01) |
| H04L 67/5681 | (2022.01) |
| H04L 67/289 | (2022.01) |
| H04L 67/52 | (2022.01) |
| H04L 67/56 | (2022.01) |

(52) U.S. Cl.
CPC ........ *H04L 67/5681* (2022.05); *H04L 67/289* (2013.01); *H04L 67/52* (2022.05); *H04L 67/56* (2022.05)

(58) Field of Classification Search
CPC ............... H04L 12/28; H04L 65/4092; H04L 29/06027; H04L 67/18; H04L 67/28; H04L 67/2847; H04L 67/289; G06F 15/173; G06F 17/30867; G06Q 30/0261; G06Q 30/0269; G06Q 30/0273; H04W 64/006; H04W 28/18; H04W 28/26; H04W 4/02; G01S 5/0027; G01S 2205/002

USPC .......................................................... 709/217
See application file for complete search history.

(56) References Cited

U.S. PATENT DOCUMENTS

| | | | | |
|---|---|---|---|---|
| 5,572,221 | A * | 11/1996 | Marlevi ................ | H04W 28/18 342/452 |
| 5,943,672 | A * | 8/1999 | Yoshida | |
| 6,263,208 | B1 | 7/2001 | Chang et al. | |
| 6,275,496 | B1 * | 8/2001 | Burns et al. .................. | 370/429 |
| 6,298,373 | B1 * | 10/2001 | Burns et al. .................. | 709/203 |
| 6,311,065 | B1 * | 10/2001 | Ushiki .................. | H04W 36/32 342/457 |
| 6,377,805 | B1 * | 4/2002 | Anvekar ............... | H04W 36/08 455/11.1 |

(Continued)

FOREIGN PATENT DOCUMENTS

CN        1109455 C      5/2003

OTHER PUBLICATIONS

Downey, Chris, "Understanding Wireless Range Calculations", Apr. 3, 2013, Electronic Design, pp. 1-7 (Year: 2013).*

(Continued)

*Primary Examiner* — June Sison
(74) *Attorney, Agent, or Firm* — Cuenot, Forsythe & Kim, LLC (57) ABSTRACT

A method of caching data at a processing node within a communication network can include predicting a future location of a user. A processing node within the communication network can be selected according to the future location. Data to be sent to the selected processing node can be selected. The selected data can be sent to the selected processing node.

20 Claims, 3 Drawing Sheets

(56) References Cited

U.S. PATENT DOCUMENTS

| | | |
|---|---|---|
| 6,414,962 B1 | 7/2002 | Hall et al. |
| 6,564,065 B1 | 5/2003 | Chang et al. |
| 6,681,108 B1 | 1/2004 | Terry et al. |
| 6,701,153 B1 | 3/2004 | Chang et al. |
| 6,748,233 B1 | 6/2004 | Arnold et al. |
| 6,757,735 B2* | 6/2004 | Apostolopulos et al. .... 709/231 |
| 6,889,053 B1 | 5/2005 | Chang et al. |
| 6,947,973 B2* | 9/2005 | Shimura et al. ............. 709/217 |
| 7,035,904 B1* | 4/2006 | Jordan, Jr. ............. H04L 51/38 370/328 |
| 7,085,576 B2 | 8/2006 | Ranganathan ............. 455/456.1 |
| 7,315,886 B1* | 1/2008 | Meenan ............... H04L 63/126 709/212 |
| 7,366,542 B2* | 4/2008 | Schmidt ........................ 455/558 |
| 7,451,205 B2* | 11/2008 | Cheung .................. H04L 29/06 709/224 |
| 7,519,470 B2* | 4/2009 | Brasche et al. ............... 701/457 |
| 7,636,779 B2* | 12/2009 | Hayashi et al. ............. 709/224 |
| 7,685,248 B1* | 3/2010 | Fein .................... H04L 67/1097 709/212 |
| 7,769,805 B1* | 8/2010 | Barnes et al. ................. 709/203 |
| 7,821,986 B2* | 10/2010 | Thomson et al. ............ 370/328 |
| 7,929,494 B1* | 4/2011 | Hamalainen et al. ........ 370/329 |
| 8,019,692 B2* | 9/2011 | Rosen ........................... 705/319 |
| 8,626,136 B2* | 1/2014 | Ozzie et al. ............... 455/414.2 |
| 9,065,595 B2* | 6/2015 | Harrang ................ H04L 1/0002 |
| 2001/0003194 A1* | 6/2001 | Shimura et al. ............. 709/310 |
| 2001/0014103 A1* | 8/2001 | Burns et al. ................. 370/429 |
| 2002/0052674 A1* | 5/2002 | Chang et al. ................. 700/300 |
| 2002/0057667 A1* | 5/2002 | Hamalainen et al. ........ 370/347 |
| 2002/0092026 A1 | 7/2002 | Janniello et al. |
| 2002/0111154 A1* | 8/2002 | Eldering ............. H04M 3/4872 455/414.1 |
| 2002/0142773 A1* | 10/2002 | Rudrapatna et al. ......... 455/440 |
| 2002/0160745 A1* | 10/2002 | Wang ........................... 455/404 |
| 2002/0198991 A1* | 12/2002 | Gopalakrishnan et al. .. 709/225 |
| 2003/0065712 A1* | 4/2003 | Cheung et al. ............... 709/203 |
| 2003/0115421 A1 | 6/2003 | McHenry et al. |
| 2003/0187984 A1* | 10/2003 | Banavar ............. H04L 67/2852 709/225 |
| 2004/0017310 A1* | 1/2004 | Vargas-Hurlston et al. ................. 342/357.1 |
| 2004/0080510 A1* | 4/2004 | Inokuchi et al. ............. 345/440 |
| 2004/0192342 A1* | 9/2004 | Ranganathan ............. 455/456.1 |
| 2004/0199631 A1* | 10/2004 | Natsume ................ H04L 67/18 709/225 |
| 2005/0114759 A1 | 5/2005 | Williams et al. |
| 2005/0132049 A1* | 6/2005 | Inoue .................. G06F 17/3087 709/225 |
| 2005/0138196 A1 | 6/2005 | Pfeffer et al. |
| 2005/0177614 A1 | 8/2005 | Bourne |
| 2005/0198286 A1* | 9/2005 | Xu et al. ....................... 709/225 |
| 2005/0198328 A1* | 9/2005 | Lee et al. ...................... 709/229 |
| 2006/0020671 A1 | 1/2006 | Pike et al. |
| 2006/0064346 A1 | 3/2006 | Steenstra et al. |
| 2006/0069501 A1 | 3/2006 | Jung et al. |
| 2006/0075139 A1 | 4/2006 | Jungek |
| 2006/0085419 A1 | 4/2006 | Rosen |
| 2006/0277271 A1* | 12/2006 | Morse et al. .................. 709/217 |
| 2007/0032244 A1* | 2/2007 | Counts et al. ............. 455/456.1 |
| 2007/0100806 A1* | 5/2007 | Ramer et al. ...................... 707/3 |
| 2007/0219708 A1* | 9/2007 | Brasche et al. ............... 701/207 |
| 2007/0255831 A1* | 11/2007 | Hayashi et al. .............. 709/226 |
| 2008/0005695 A1* | 1/2008 | Ozzie et al. ................... 715/811 |
| 2008/0009268 A1* | 1/2008 | Ramer et al. .............. 455/412.1 |
| 2008/0085724 A1* | 4/2008 | Cormier .................. H04L 67/18 455/456.1 |
| 2008/0117201 A1* | 5/2008 | Martinez et al. ............. 345/418 |
| 2008/0134030 A1* | 6/2008 | Kansal et al. ................. 715/700 |
| 2008/0268816 A1* | 10/2008 | Wormald .............. H04W 68/00 455/412.2 |
| 2009/0054043 A1 | 2/2009 | Hamilton |
| 2009/0222584 A1* | 9/2009 | Josefsberg et al. ........... 709/245 |
| 2009/0265245 A1* | 10/2009 | Wright ............... G06Q 30/0277 705/14.66 |
| 2012/0253855 A1* | 10/2012 | Chand et al. ..................... 705/5 |
| 2013/0006777 A1* | 1/2013 | Krishnareddy ........ G06Q 30/00 705/14.66 |

OTHER PUBLICATIONS

Hefny, Mohammad Said, "Exploring GoogleGears Wi-Fi Geo Locator Secrets" Apr. 14, 2010, Code Project, pp. 1-6 (Year: 2010).*

Stack Overflow, "How to Calculate Distance from WiFi Router Using Signal Strength" Stack Overflow, Jun. 27, 2012, pp. 1-5 (Year: 2010).*

Motani et al., "PeopleNet: Engineering A Wireless Virtual Social Network", ACM, MobiCom 2005, Aug. 28-Sep. 2, 2005, Cologne, Germany (2005).

Consolvo et al., "Location Disclosure to Social Relations: Why,When, & What People Want to Share", ACM, CHI 2005, Apr. 2-7, 2005, Portland, Oregon, USA (2005).

Lee et al., "Modeling Steady-state and Transient Behaviors of User Mobility: Formulation, Analysis, and Application", ACM, MobiHoc 2006, May 22-25, 2006, Florence, Italy (2006).

GHOSH et al., "On Profiling Mobility and Predicting Locations of Wireless Users", ACM, REALMAN 2006, May 26, 2006, Florence, Italy (2006).

Karam et al., "Putting Systems into Place: A Study of Design Requirements for Location-Aware Community Systems", (2004).

Lauw et al., "Mining Social Network from Spatio-Temporal Events", Workshop on Link Analysis, Counterterrorism and Security, Newport Beach, California (Apr. 23, 2005).

Das et al, "Adaptive Location Prediction Strategies Based on a Hierarchical Network Model in a Cellular Mobile Environment", The Computer Journal, 42(6), pp. 473-486 (1999).

Karakaya, "Improving Broadcast Scheduling Performance through Movement Prediction, Data Staging, and Ad Hoc Networking", Thesis Proposal, Department of Computer Engineering, Bilkent University (2002).

Cheng et al., "Location Prediction Algorithms for Mobile Wireless Systems", Wireless Internet Handbook: Technologies, Standards, and Application, CRC Press, Inc., Boca Raton, Florida, USA, pp. 245-263 (2003).

* cited by examiner

CACHING DATA AT NETWORK PROCESSING NODES BASED ON DEVICE LOCATION

BACKGROUND OF THE INVENTION

Portable computing devices, including mobile devices, allow users to perform computing tasks virtually anywhere. While computing devices continue to offer increased computational power, increased portability, and better power management, access to data is still required for the devices to be useful. In other words, though the capabilities of computing devices continue to improve, one still needs access to data to make productive use of the devices.

In the usual case, a user manually copies data to the computing device prior to taking a trip or "going mobile". The user must identify any data that may be needed to work remotely and copy that data prior to leaving. Typically, users copy the data directly to the portable computing device. Many times, however, users do not copy all of the data that is, or will be, needed. It is not always possible to foresee all of the data that one may need while away and, in other cases, the user may simply forget to copy one or more items of information.

Another way to transport data is to copy the data to an external storage device. It may be the case that the amount of data to be copied exceeds the limited storage capacity of the portable communication device. The user, therefore, is inconvenienced by having to carrying both the portable computing device and the external storage device. Further, the user must wrestle with making physical connections between the storage device and the portable computing device before being able to access the needed data.

In other situations, rather than bringing a copy of the data, the user instead attempts to access his or her data through some sort of remote networking technology. For example, the user may attempt to link to a communication network of an employer using virtual private networking, a secure Website, or the like. If the data needed by the user is large, access to the data may be hampered by low data transmission rates of the employer network or the connection to the employer network. Delays associated with sending data over large distances can further hamper data access.

BRIEF SUMMARY OF THE INVENTION

The present invention relates to a method of caching data at a processing node within a communication network. A future location of a user can be determined. A processing node within the communication network can be selected according to the future location. Data to be sent to the selected processing node can be selected and sent to the selected processing node.

The present invention also relates to a system for caching data at a processing node within a communication network. The system can include a prediction module determining a future location of a user. The prediction module can select the processing node within the communication network according to the future location. The system also can include a data selection module that identifies data to be sent to the selected processing node and a controller that sends the selected data to selected processing node.

The present invention also relates to a computer program product including a computer-usable medium having computer-usable program code that sends data to a processing node within a communication network. The computer program product can include computer-usable program code that determines a future location of a user, computer-usable program code that selects a processing node within the communication network according to the future location, and computer-usable program code that selects data to be sent to the selected processing node. The computer program product further can include computer-usable program code that sends the selected data to the selected processing node.

DETAILED DESCRIPTION OF THE INVENTION

As will be appreciated by one skilled in the art, the present invention may be embodied as a method, system, or computer program product. Accordingly, the present invention may take the form of an entirely hardware embodiment, or an embodiment combining software and hardware aspects that may all generally be referred to herein as a "circuit", "module", or "system".

Furthermore, the invention may take the form of a computer program product accessible from a computer-usable or computer-readable medium providing program code for use by, or in connection with, a computer or any instruction execution system. For the purposes of this description, a computer-usable or computer-readable medium can be any apparatus that can contain, store, communicate, propagate, or transport the program for use by, or in connection with, the instruction execution system, apparatus, or device.

Any suitable computer-usable or computer-readable medium may be utilized. For example, the medium can include, but is not limited to, an electronic, magnetic, optical, electromagnetic, infrared, or semiconductor system (or apparatus or device), or a propagation medium. A non-exhaustive list of exemplary computer-readable media can include an electrical connection having one or more wires, an optical fiber, magnetic storage devices such as magnetic tape, a removable computer diskette, a portable computer diskette, a hard disk, a rigid magnetic disk, an optical storage medium, such as an optical disk including a compact disk-read only memory (CD-ROM), a compact disk-read/write (CD-R/W), or a DVD, or a semiconductor or solid state memory including, but not limited to, a random access memory (RAM), a read-only memory (ROM), or an erasable programmable read-only memory (EPROM or Flash memory).

A computer-usable or computer-readable medium further can include a transmission media such as those supporting the Internet or an intranet. Further, the computer-usable medium may include a propagated data signal with the computer-usable program code embodied therewith, either in baseband or as part of a carrier wave. The computer-usable program code may be transmitted using any appropriate medium, including but not limited to the Internet, wireline, optical fiber, cable, RF, etc.

In another aspect, the computer-usable or computer-readable medium can be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention relates to caching data at one or more processing nodes within a communication network. A future location of a communication device associated with a user can be determined according to any of a variety of different location estimation techniques. Based upon the future location, a processing node can be identified. Data associated with the user that is stored in the communication network can be propagated to the identified processing node and cached such that the user can more efficiently access that data. For example, the processing node at which the data is cached can be one that is determined to be close, or the closest, to the future location of the user. This can reduce the number of network nodes, or hops, through which the data must travel to reach the user and improve system responsiveness.

Figure 1:
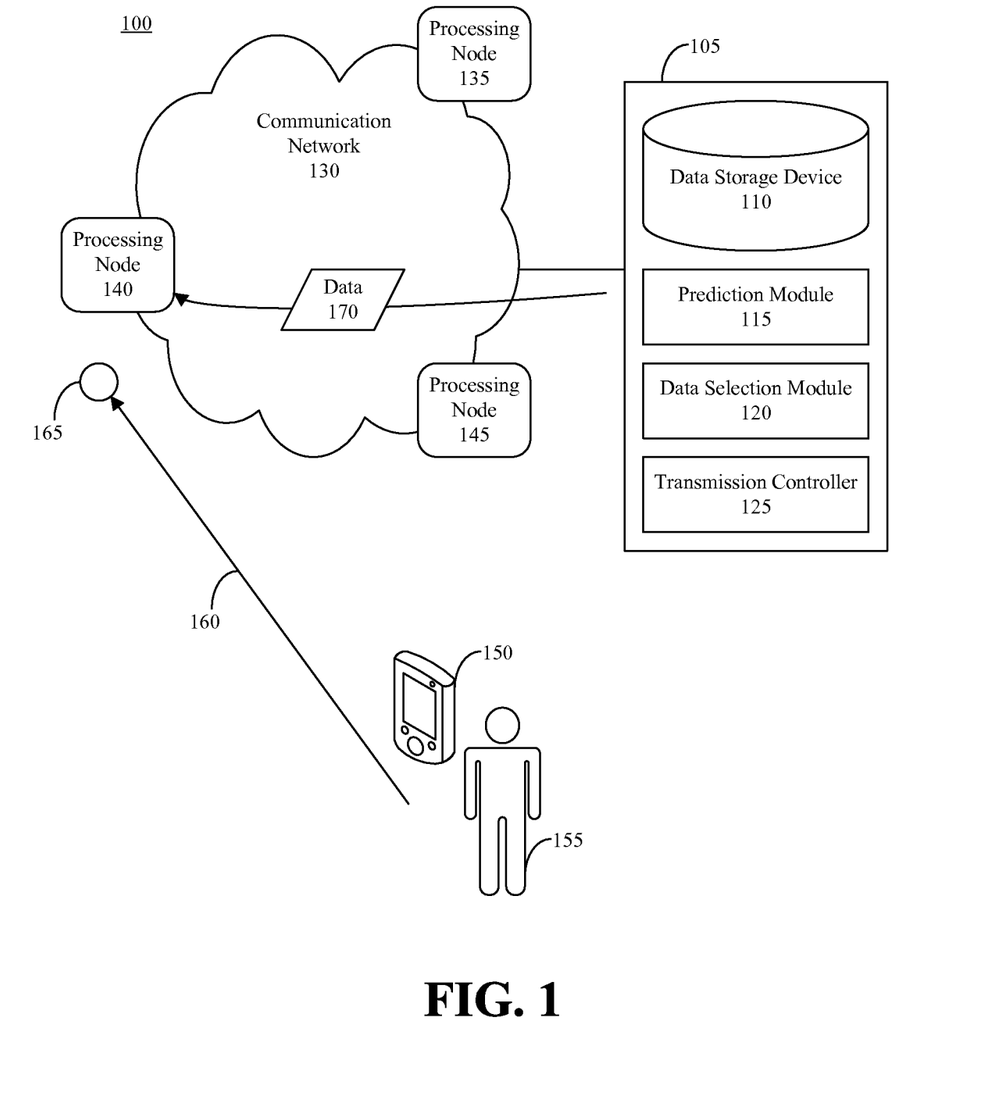
FIG. 1 is a block diagram illustrating a system in accordance with one aspect of the present invention.

FIG. 1 is a block diagram illustrating a system 100 in accordance with one aspect of the present invention. The system 100 can include a caching controller 105, a communication network 130, and a plurality of processing nodes 135, 140, and 145. The caching controller 105 can include one or more data storage devices illustrated as data storage device 110, a prediction module 115, a data selection module 120, and a transmission controller 125. As shown, the caching controller 105 can be communicatively linked with, and further be part of, the communication network 130. The processing nodes 135-145 also can be included as part of the communication network 130.

The communication network 130 can be implemented as, or include, without limitation, a WAN, a LAN, the Public Switched Telephone Network (PSTN), the Web, the Internet, and one or more intranets. The communication network 130 further can include one or more wireless networks, whether short or long range. For example, in terms of short range wireless networks, the communication network 130 can include a local wireless network built using Bluetooth or one of the IEEE 802 wireless communication protocols, i.e., 802.11a/b/g/i, 802.15, 802.16, 802.20, Wi-Fi Protected Access (WPA), or WPA2. In terms of long range wireless networks, the communication network 130 can include a mobile, cellular, and or satellite-based wireless network and support voice, video, text, and/or any combination thereof, i.e., GSM, TDMA, CDMA, and/or WCDMA network.

The processing nodes 135-145 can be implemented as computer systems, e.g., servers or other information processing systems. As such, each of the processing nodes 135-145 can include a data storage device. In one arrangement, each of the processing nodes 135-145 can be implemented as an "edge server". That is, each of the processing nodes 135-145 can be located at distinct and different physical location within the communication network 130. For example, the communication network 130 can cover an extended geographic area, whether a city, a state, a region comprising a plurality of states, or the like. In one arrangement, the communication network 130 can be a global network. The processing nodes 135-145 can be distributed throughout that geographic area.

A computing device 150 of a user 155 can access the communication network 130 via any of the processing nodes 135-145. The computing device 150 can include, but is not limited to, a mobile station, a portable computer such as a laptop computer, a smart phone, a personal digital assistant, a conventional computer accessed by the user at a remote location, or the like. The computing device 150 can establish a communication link with the communication network 130 via any of a variety of different access points, whether wired or wireless, through which communications with the processing nodes 135-145 can be established.

In general, the caching controller 105 can send data, or a dataset, 170 that may be needed by the user 155 to one or more of the processing nodes 135-145 according to a predicted future location 165 of the user 155. The data storage device 110, as noted, can be composed of one or more data storage devices. The data storage device 110 can store information that is used by the user 155 or that belongs to the user 155. For instance, the data storage device 110 can provide centralized storage for a business entity or some other organization of which user 155 is a member.

The prediction module 115 can predict the future location 165 of the user 155. Once the future location 165 is predicted by the prediction module 115, the prediction module 115 can identify a processing node 135-145 that is closest to the future location 165. The future location 165 can be determined according to any of a variety of different techniques. In one aspect, the prediction module 115 can include a location tracking system, such as a Global Positioning System (GPS) unit. In that case, either the user 155 can be equipped with a GPS device capable of sending coordinates or the computing device 150 can be GPS enabled such that the prediction module 155 can determine a path or heading 160 of the user 155 from the location tracking system. As used herein, a "heading" can refer to, or specify, a direction and/or a velocity at which an object travels in the indicated direction.

Throughout this specification reference is made to the location of the user or the location of the computing device of the user. The phrases are used interchangeably in the sense that the location of one or more computing devices or tracking devices can be used as a proxy for the location of the user that is associated with such devices. Accordingly, if the location of a communication device is determined, it is assumed that the user associated with that communication device is located at or near the same location, has the same heading, etc.

In another arrangement, the prediction module 115 can be programmed with one or more locations that the user 155 has visited. These locations can be profiled in terms of the number of times the user 155 visited each location, e.g., frequency, the dates and/or times that the user 155 visited the locations, and the like. Accordingly, in selecting a particular location, the prediction module 115 can review the heading 160, a list of locations visited by the user, and the profile of the locations. Thus, if two locations are potential candidates for being selected as the future location 165, the profile information can be used to select among the candidates. For example, if the user is traveling in December, locations visited by the user in a prior December can be selected over other locations not visited in December if the prediction module 115 is attempting to choose among a plurality of otherwise equally likely potential locations. Similar processing can be performed in terms of the time of day, day of the week, holidays, etc.

In another arrangement, a social network can be used to predict the future location 165. In that case, members of a social network to which the user 155 belongs can be tracked or locations associated with the members of the social network can be programmed into the prediction module 115. Using the heading 160, the future location 165 can be selected according to locations associated with members of the social network that are close to, or in the path of, the user 155 as determined using the heading 160.

It should be appreciated that in using a tracking system, map information can be used in conjunction with the heading 160. As such, the prediction module 115, having selected the future location 165 of the user 155, can determine a likely arrival time for the user 155. For example, the prediction module 115 can take into account the heading 160, actual travel routes as specified by a map, expected congestion and/or traffic delays and the like.

In another arrangement, the user 155 can simply specify a location that he or she will be visiting and the dates and/or times at which the visit will occur. This information can be provided to the prediction module 115. It should be appreciated that any of the techniques described herein can be used independently of the others or in combination. For example, if tracking system information is not available, locations can be determined from prior locations visited at this time of year, prior locations associated with the members of the social network of the user 155, prior locations associated with members of the social network that the user visited at this time of year in the past, etc.

In any case, once the future location 165 is determined or predicted by the prediction module 115, the prediction module 115 can identify a processing node that is closest to the future location 165. The prediction module 115 can be programmed with the location of the processing nodes 135-145 to facilitate making such decisions. In another arrangement, the prediction module 115 need not select the closest processing node to the future location 165, but rather a processing node that is more likely to provide the user 155 with a better experience. For example, a processing node that is capable of providing access to data at a higher data rate can be selected over another processing node that is closer to the future location 165. In illustration, an area surrounding the future location 165 can be identified and any processing node in that surrounding area can be a potential candidate that can be selected based upon a variety of factors such as distance to the future location 165, transmission rate, the workload of the processing node, etc.

The data selection module 120 can select the data 170 that is to be sent or pushed to the processing node 140 based upon the future location 165 of the user 155. As known, "pushing" data refers to the sending of data that is initiated, for example, by a server, rather than responsive to a client request. The data selection module 120 can select the data 170 using any of a variety of different techniques which can involve tracking prior accesses of data by the user as well as the particular location from which the user accesses such data.

In one arrangement, the data selection module 120 can select data that was recently accessed by the user 155 as the data 170. The data items selected as data 170 can be accessed over a predetermined period of time, i.e., the last 5 days, the last week, the last month, etc. In another arrangement, the data selection module 120 can select data that was accessed by the user 155 during a prior visit to the future location 165 as the data 170. In yet another arrangement, data accessed most frequently, for example, as measured over the last several days, weeks, months, etc. can be selected as data 170. Still, the user 165 can directly specify the data 170 that should be made available.

The transmission controller 125 can send the data 170 to the selected processing node, e.g., processing node 140. The transmission controller 125 can send the data 170 at a variety of different transmission rates, or data rates, according to one or more factors. In one aspect, the transmission controller 125 can send the data 170 at a rate determined by the level of service of the user 155. If the user 155 has an entitlement agreement in place with a service provider, the agreement can dictate the rate at which the data 170 will be sent through the network 130 to the processing node 140.

In another arrangement, the transmission controller 125 can set or vary the rate according to the distance between the user 155 and the future location 165. In that case, the transmission controller 125 can set higher transmission rates for users that are closer to their future locations than for users that are located greater distances from their future locations. This technique helps to ensure that when the user 155 arrives at the future location 165, the data 170 will be properly cached at the selected processing node 140. That is, since users closer to their future locations will, in general, be more likely to arrive earlier in time than those that are farther, increased data rates can be set for such users.

In another aspect, the transmission rate can be set according to an expected arrival time. Thus, if user A is located 10 miles from his or her future location and is traveling through an urban area, and another user B is located 15 miles from his or her future location but traveling on a highway, the transmission controller 125 can set the transmission rate for user B to be higher than the transmission rate for user A. In that case, user B is expected to arrive prior to user A, despite user B being a greater distance from the future location than user A. As noted, the prediction module 115 can account for actual travel routes, traffic, maps, and the like and make prediction information such as expected arrival times available to the transmission controller 125. It further should be appreciated that the data rate can be varied dynamically as circumstances relating to distance, arrival time, etc. change over time.

In operation, the caching controller 105 can predict where the user 155 will be located at some future point in time. The caching controller 105 can determine that, based upon the current location of the user 155 and a known heading 160, or any other information as described herein, the user 155 will likely be located at location 165 at a given time, or within a predetermined amount of time, in the future. The caching controller 105 can select data 170 and push the data 170 to one or more of the processing nodes 135-145 based upon the predicted future location 165. For instance, the caching controller 105 can push the selected data 170 to the processing node 140 in the expectation that the user will be located closer to processing node 140 than to any of the other processing nodes in the communication network 130.

The communication device 150 can establish a communication link with the communication network 125 via any suitable technology, whether wireless or wired. Once connected, the communication device 150 can issue a request for the IP address of an edge cache server to a local domain name server (DNS). The local DNS can forward the request to a root DNS, which can respond with an IP address for the edge cache service DNS. The local DNS can request the IP address of the optimal edge cache server, i.e., processing node 140, from the edge cache service DNS. The edge cache service DNS can return the IP address of the optimal edge cache server. The selection of the optimal edge cache server, i.e., processing nodes 135-145, can be determined from the IP address of the local DNS. The local DNS can return the IP address to the networked communication device 150. The edge cache server, i.e., processing node 140, can respond to requests from the communication device 150.

It should be appreciated that if the processing node determined, for example, processing node 135, is not the same processing node selected by the caching controller 105, i.e., processing node 140, then responsive to a first request from the communication device 150 to the processing node 135, the caching controller 105 can be informed. The caching controller 105 can begin to transmit data to the processing node 135 that has established communications with the computing device 150. Further, data can be cached regarding which processing node the user has accessed such that subsequent data requests from the communication device 150 can be processed in less time. In another embodiment, the IP address of the processing node that has been populated, i.e., processing node 140, can be returned rather than the IP address of another processing node that may be located closer to the actual or future (estimated) location of the user.

Figure 2:
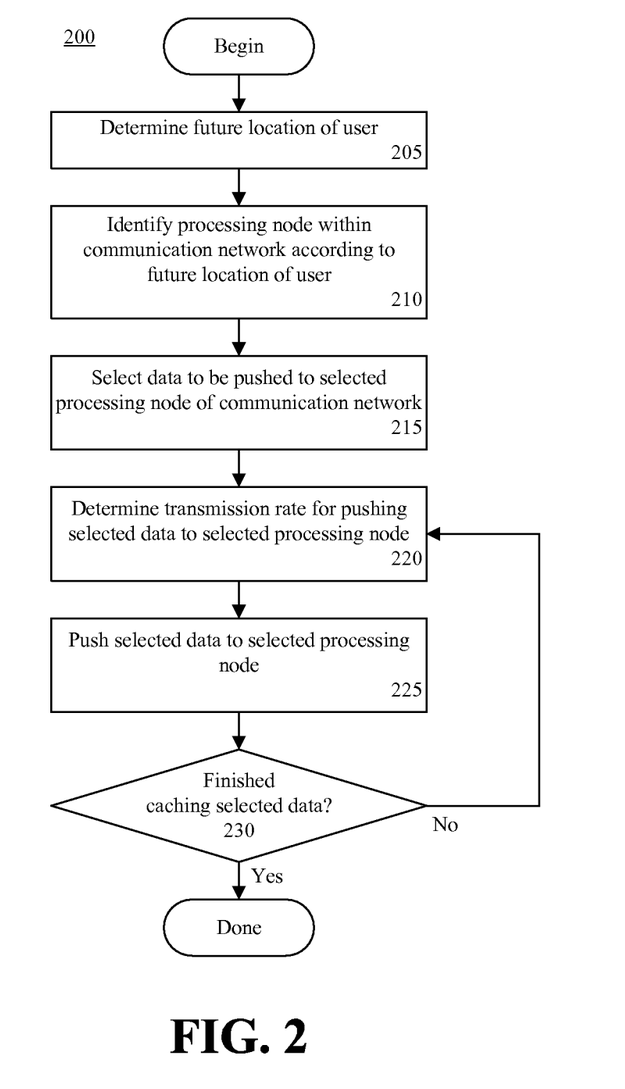
FIG. 2 is a flow chart illustrating a method of caching data within a communication network in accordance with another aspect of the present invention.

FIG. 2 is a flow chart illustrating a method 200 of caching data within a communication network in accordance with another aspect of the present invention. The method 200 can be implemented using the system illustrated in FIG. 1. Accordingly, in step 205, an estimate of the future location of the user can be determined. The estimate, or prediction, of the future location of the user can be determined using a location tracking system, a social network, a pattern of previously visited locations, a user declared future location, or any combination thereof.

In step 210, a processing node within the communication network can be identified according to the future location of the user. In one aspect, the processing node that is identified can be the one that is closest to the future location. In another aspect, the processing node that is identified can be one that is determined to be able to provide the highest quality of service or one that has already been populated with data. In step 215, the data that will be pushed to the selected processing node and cached can be selected. As noted, the data can be data that was directly identified by the user, data that was recently accessed by the user, data that was frequently accessed by the user, data that was accessed by the user during a prior visit to the future location, or any combination thereof.

In step 220, a transmission rate can be selected for pushing the selected data to the selected processing node. As noted, the transmission rate can be selected according to the distance between the user, or the user's device, and the future location, the expected arrival time of the user at the future location, or by a service agreement. In step 225, the selected data can be pushed to the selected processing node. That is, transmission of the data can be started. In step 230, a determination can be made as to whether the selected data has been cached at the selected processing node. If so, the method can end, if not, the method can loop back to step 220. Looping back to step 220 illustrates an aspect in which the transmission rate can be dynamically varied according to any of the factors disclosed herein. In another aspect, however, the transmission rate can remain constant until the data is cached at the selected processing node.

Figure 3:
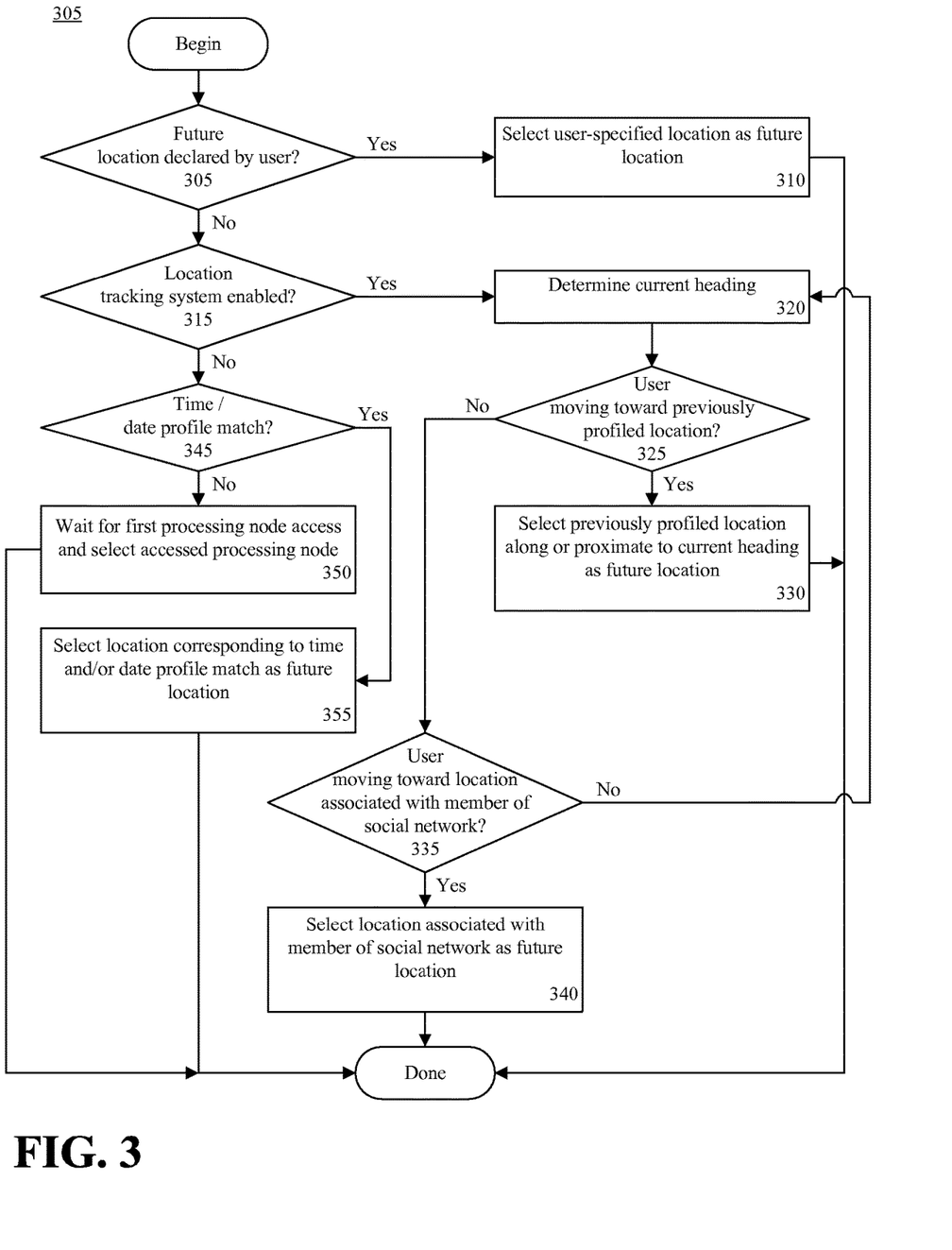
FIG. 3 is a flow chart illustrating a method of determining a future location of a user in accordance with another aspect of the present invention.

FIG. 3 is a flow chart illustrating a method 300 of determining a future location of a user and/or communication device in accordance with another aspect of the present invention. The method 300 can be implemented by the system illustrated in FIG. 1. It should be appreciated that the method 300 illustrates one example of how the future location of a user can be determined and, as such, is not intended to limit the present invention in any way or to suggest that only particular techniques or technologies are to be used. Accordingly, the method 300 can begin in step 305 where a determination is made as to whether the user has declared a future location to the system. If so, the method can proceed to step 310 where the user-specified location is selected as the future location. If the user did not directly specify a location, the method can proceed to step 315.

In step 315, a determination can be made as to whether the location tracking system is enabled. If so, the method can proceed to step 320. If not, the method can continue to step 345. In step 320, a current heading of the user, or the mobile device, can be determined. In step 325, a determination can be made as to whether the user is moving toward any previously profiled locations. If so, the method can proceed to step 330, where one of the previously profiled locations can be selected as the future location. For example, the previously profiled location that is closest to the anticipated path of the user based upon the heading and/or any mapping information can be selected. If the user is not moving toward any previously profiled location, the method can proceed to step 335.

In step 335, a determination can be made as to whether the user, or the communication device of the user, is moving toward any locations associated with members of a social network to which the user belongs. If so, the method can continue to step 340. In step 340, a location associated with a member of the social network can be selected as the future location of the user. If the user is not moving toward a location associated with a member of the social network, the method can loop back to step 320 to continue monitoring the heading of the user.

Continuing with step 345, in the case where the location tracking system is disabled, a determination can be made as to whether the time and/or date profile of any previously visited locations of the user match the current time and/or date. If so, the method can proceed to step 355. If not, the method can continue to step 350.

In step 350, the caching controller can wait for a first processing node accessed by the user. That is, the system can await a first request for data from the user and locate the particular processing node to which the user request was provided. Once determined, that processing node can be selected as the closest to the future location of the user and populated with selected data, i.e., cache the selected data. If time and/or date profile information for previously visited locations does correspond with the current time and/or date, the location having matching time and/or date profile information can be selected as the future location.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to the embodiments thereof, it will be apparent that modifications and variations are possible without departing from the scope of the invention defined in the appended claims.

What is claimed is:

1. A method within a communication system including a plurality of edge servers, comprising:
   receiving location information about a user of the communication system;
   predicting, using the location information, a future location of a user;
   selecting, based upon the predicted future location, one of the plurality of edge servers as a selected edge server;
   calculating, using the location information and the predicted future location, a distance between the user and the predicted future location of the user;
   selecting data to be sent to the selected edge server;
   selecting a transmission rate based upon the calculated distance; and
   pushing a transmission of the selected data to the selected edge server using the selected transmission rate.

2. The method of claim 1, wherein
   the transmission rate is further selected based upon a factor associated with an estimated arrival time that is independent of the calculated distance.

3. The method of claim 1, wherein
   the transmission rate of the selected data during the transmission is dynamically variable.

4. The method of claim 1, wherein
   the selected data is sent to the selected edge server to arrive at the selected edge server prior to the user communicating with the edge server.

5. The method of claim 1, wherein
   the transmission rate is further selected based upon a level of service associated with the user.

6. The method of claim 1, wherein
   the selected data is an external dataset that was accessed by the user during a prior visit to the future location.

7. The method of claim 1, wherein
   the selected data is transmitted from a data storage device that belongs to the user.

8. The method of claim 1, wherein
the user specifies the selected data.

9. A communication system including a plurality of edge servers, comprising:
 a hardware processor configured to initiate the following executable operations:
  receiving location information about a user of the communication system;
  predicting, using the location information, a future location of a user;
  selecting, based upon the predicted future location, one of the plurality of edge servers as a selected edge server;
  calculating, using the location information and the predicted future location, a distance between the user and the predicted future location of the user;
  selecting data to be sent to the selected edge server;
  selecting a transmission rate based upon the calculated distance; and
  pushing a transmission of the selected data to the selected edge server using the selected transmission rate.

10. The system of claim 9, wherein
the transmission rate is further selected based upon a factor associated with an estimated arrival time that is independent of the calculated distance.

11. The system of claim 9, wherein
the transmission rate of the selected data during the transmission is dynamically variable.

12. The system of claim 9, wherein
the selected data is sent to the selected edge server to arrive at the selected edge server prior to the user communicating with the edge server.

13. The system of claim 9, wherein
the transmission rate is further selected based upon a level of service associated with the user.

14. The system of claim 9, wherein
the selected data is an external dataset that was accessed by the user during a prior visit to the future location.

15. The system of claim 9, wherein
the selected data is transmitted from a data storage device that belongs to the user.

16. The system of claim 9, wherein
the user specifies the selected data.

17. A computer program product, comprising:
 a hardware storage device having computer-usable program code stored therein,
 the computer-usable program code, which when executed a communication system that includes a plurality of edge servers, causes the communication system to perform:
  receiving location information about a user of the communication system;
  predicting, using the location information, a future location of a user;
  selecting, based upon the predicted future location, one of the plurality of edge servers as a selected edge server;
  calculating, using the location information and the predicted future location, a distance between the user and the predicted future location of the user;
  selecting data to be sent to the selected edge server;
  selecting a transmission rate based upon the calculated distance; and
  pushing a transmission of the selected data to the selected edge server using the selected transmission rate.

18. The computer program product of claim 17, wherein
the transmission rate is further selected based upon a factor associated with an estimated arrival time that is independent of the calculated distance.

19. The computer program product of claim 17, wherein
the transmission rate of the selected data during the transmission is dynamically variable.

20. The computer program product of claim 17, wherein
the transmission rate is further selected based upon a level of service associated with the user.

* * * * *